US009232257B2

(12) United States Patent
Gautier et al.

(10) Patent No.: US 9,232,257 B2
(45) Date of Patent: Jan. 5, 2016

(54) METHOD FOR NAVIGATION IN A PANORAMIC SCENE

(75) Inventors: Eric Gautier, Cesson-Sévigné (FR); Yvon Legallais, Cesson-Sévigné (FR); Anthony Laurent, Cesson-Sévigné (FR)

(73) Assignee: Thomson Licensing, Issy-les-Moulineaux (FR)

( * ) Notice: Subject to any disclaimer, the term of this patent is extended or adjusted under 35 U.S.C. 154(b) by 672 days.

(21) Appl. No.: 13/200,025

(22) Filed: Sep. 15, 2011

(65) Prior Publication Data

US 2012/0242781 A1 Sep. 27, 2012

(30) Foreign Application Priority Data

Sep. 22, 2010 (FR) ........................ 10 57601

(51) Int. Cl.
*H04N 21/414* (2011.01)
*H04N 21/218* (2011.01)
*H04N 21/43* (2011.01)
*H04N 21/44* (2011.01)
*H04N 21/63* (2011.01)
(Continued)

(52) U.S. Cl.
CPC ... *H04N 21/41415* (2013.01); *H04N 21/21805* (2013.01); *H04N 21/4307* (2013.01); *H04N 21/44004* (2013.01); *H04N 21/631* (2013.01); *H04N 21/6373* (2013.01); *H04N 21/845* (2013.01)

(58) Field of Classification Search
CPC H04N 5/23238; H04N 5/2628; H04N 5/2259
See application file for complete search history.

(56) References Cited

U.S. PATENT DOCUMENTS 7,006,111 B1  2/2006 Rothrock
8,427,538 B2 * 4/2013 Ahiska .................. 348/143
(Continued)

FOREIGN PATENT DOCUMENTS

CA  2012797  12/1990
EP  1087618  3/2001
(Continued)

OTHER PUBLICATIONS

Carsten Grunheit, Efficient representation and interactive streaming of high-resolution panoramic views, 2002, IEEE 2002 International Conference, vol. 3, 209-212.*
(Continued)

*Primary Examiner* — Dave Czekaj
*Assistant Examiner* — Nam Pham
(74) *Attorney, Agent, or Firm* — Myers Wolin LLC

(57) ABSTRACT

The invention relates to a method for navigation in a panoramic video sequence displayed on a user terminal. The video sequence is divided into a plurality of non-overlapping video patches each corresponding to a zone of the video sequence. The video patches required to form a zone of the panoramic video sequence to be displayed on a screen of the user terminal, called the visibility zone, are determined according to navigation commands.
According to the invention, the video patches are provided to the user terminal, for one part, via a first transmission network and, for another part, via a second transmission network distinct from said first transmission network.

18 Claims, 6 Drawing Sheets

(51) Int. Cl.
*H04N 21/6373* (2011.01)
*H04N 21/845* (2011.01)

(56) References Cited

U.S. PATENT DOCUMENTS

| | | |
|---|---|---|
| 2002/0021353 A1 | 2/2002 | DeNies |
| 2005/0021779 A1* | 1/2005 | Ahamed et al. ............... 709/229 |
| 2005/0165911 A1 | 7/2005 | Homiller |
| 2008/0256359 A1 | 10/2008 | Kahn et al. |
| 2009/0115798 A1 | 5/2009 | Shimada et al. |
| 2010/0265401 A1 | 10/2010 | Yuki |

FOREIGN PATENT DOCUMENTS

| | | |
|---|---|---|
| JP | 2002269591 | 9/2002 |
| JP | 2003111050 | 4/2003 |
| JP | 2003199074 | 7/2003 |
| JP | 2003536319 | 12/2003 |
| JP | 2009147571 | 7/2009 |
| WO | WO0119079 | 3/2001 |
| WO | WO2005055607 | 6/2005 |
| WO | WO2010041457 | 4/2010 |

OTHER PUBLICATIONS

Chan et al., "Data Compression and Transmission Aspects of Panoramic Videos", IEEE Transactions on Circuits and Systems for Video Technology, vol. 15, No. 1, Jan. 1, 2005, pp. 82-95.
Granheit et al., "Efficient Representation and Interactive Streaming of High-Resolution Panoramic Views", International Conference on Image Processing, vol. 3, Sep. 22, 2002.
French Search Report dated May 26, 2011.
LEI et al. "Adaptive streaming panoramic video for image based rendering system" 2005 IEEE International Conference Networking, Sensing and Control, Piscataway, NJ, USA, 2005, pp. 153-158.
"Information Technology—Generic Coding of Moving Pictures and Audio: Systems: Transport of scalable video over ITU-T Rec. H.222.0", ISO/IEC 13818-1, Amend 3, Mar. 15, 2004, pp. 1-28.
Pantos: "HTTP Live Streaming draft-pantos-http-live-streaming-01" Apple Inc, Jun. 8, 2009, pp. 1-17.
Chen, S., "QuickTime VR—An Image-Based Approach to virtual environment navigation", Computer Graphics, vol. 29, 1995, pp. 29-38.

* cited by examiner

METHOD FOR NAVIGATION IN A PANORAMIC SCENE

This application claims the benefit, under 35 U.S.C. §119 of FR Patent Application 1057601, filed 22 Sep. 2010.

FIELD OF THE INVENTION

The present invention relates to a method for navigation in a panoramic video sequence displayed on a user terminal.

BACKGROUND OF THE INVENTION

Internet services using an interactive navigation via panoramic images have met with great success over the past few years. With these services, the user can notably have access and recover visual information from celebrity sites, virtually visit town or museums, move about virtually inside buildings, etc. These services are based on a technique know as IBR (Image Based Rendering) that, instead of using complex 3D modelling tools to construct graphic models, uses as texture imaging from the real world and applies these to basic 3D objects, such as cylinders, tubes or spheres, in which the user can navigate. The main disadvantage of the IBR technique is that it only enables the reproduction of static scenes.

Also, a few years ago, a technique known as VBR (Video Based Rendering) appeared in which the textures applied to the 3D object are video streams. According to this technique, several synchronised video streams are generated for example via a panoramic camera to capture the entire dynamic scene using several viewpoints. These streams are then processed and applied to the 3D object. The user can then navigate in this dynamic scene with the sensation of being immersed in it and of being at the heart of the action.

In the context of interactive navigation via panoramic images, a document is known entitled "Efficient Representation and interactive streaming of high-resolution panoramic views" by Carten Grünheit, Aljoscha Smolic and Thomas Wiegand, ICIP 2002. This document describes a procedure in which video streams of the panoramic scene are transmitted from a server to a user terminal according to navigation commands coming from the user. The video stream of the panoramic scene is a sequence of temporally successive panoramic images. In order to facilitate the transmission of this panoramic video sequence, it is divided into a plurality of non-overlapping video portions of pre-defined size forming a mosaic. These video portions are called video patches in the document cited previously and in the remainder of the present description. Each video patch corresponds to a spatial zone of the panoramic video sequence and presents a specific spatial position in the panoramic view. The video patch can comprise a fixed or variable number of successive video patches. This division of the panoramic video sequence into video patches is shown in FIG. 1. A panoramic video sequence 10 is divided into a plurality of video patches 11. Each video patch is coded separately in the server. The part of the video sequence referenced 12 represents the part of the sequence that is displayed on the screen of the user terminal. This zone is defined by the navigation commands transmitted by the user terminal and is called the visibility zone hereafter in the description.

FIG. 2 shows an example of the visibility zone 12 overlapping several video patches, referenced 11a to 11d. In this case so that the user terminal can display part 12, the server must transmit to it at least these 4 video patches.

So that the user has the impression of being immersed in the scene, it is necessary that the display of the video patches on the screen of the user terminal is rapid and fluid. For this purpose, a pre-fetching process of video patches is defined in the previously cited document. This process consists in triggering at the server the transmission of video patches even before they are contained in the visibility zone 12. The client requests of the server to transmit the video patches corresponding to a certain zone of the panoramic view and later than a given presentation timestamp, this presentation timestamp being estimated according to the current timestamp and the maximum time necessary to receive the patches. It also involves loading in the user terminal not only the video patches belonging to the current visibility zone but also those that are likely to be if the visibility zone moves in any direction following a user navigation command.

For this purpose, a zone 13, called a detection zone, is defined for each video patch 11, said zone 13 surrounding the image portion of the video patch 11 as shown for example in FIG. 3. In this example, the frontier of the image portion of the video patch and the frontier of its detection zone are separated by a distance d over the entire perimeter of the image portion. Once the visibility zone 12 enters the detection zone 13, a demand is transmitted to the server requesting it to transmit the video patch 11 to the user terminal.

In the example of FIG. 4, the part 12 overlaps the detection zones, referenced 13a to 13f, of six video patches 11a to 11f. The video patches 11a to 11f are thus pre-fetched into the user terminal on request by it while only the video patches 11a to 11d are comprised, in part or entirely, in the current visibility zone 12.

The pre-fetching of video patches in the user terminal enables overcoming, at least in part, the latency time between the transmission of the request and the reception of video patches by the user terminal.

The size of the detection zone 13 is made sufficiently large so that the request is transmitted sufficiently early to the server in order to obtain good navigation speed without however being too big to pre-fetch in the user terminal a too high number of video patches (knowing that some among them will never be displayed on the screen afterwards) and thus penalise the fluidity of the navigation. In fact, the size of the detection zone must be defined in order to obtain a good compromise between the fluidity and speed of the navigation. The navigation fluidity depends on the loading capacity of the user terminal processor, which diminishes with the size of the detection zone (more data to be downloaded. Conversely the navigation speed is proportional to the size of the detection zone (more time to load the data). This compromise is not however always easy to determine.

Moreover, the fluidity and the speed of navigation can be affected by dimensions of the direct channel of the network transporting the video patches and/or the return channel transporting the requests.

One aim of the present invention is to propose a method for interactive navigation in a panoramic video sequence enabling at least to partially overcome the disadvantages previously cited.

SUMMARY OF THE INVENTION

According to the invention, it is proposed to use at least two distinct transmission networks for the transmission of video patches to the user terminal.

The purpose of the invention is thus a method for navigation in a panoramic video sequence displayed on a user terminal, the panoramic video sequence being divided into a plurality of non-overlapping video portions, called video patches, each corresponding to a zone of the panoramic video sequence, each video patch having a predefined size and a spatial position in said panoramic video sequence, the video patches required to form a zone of the panoramic video sequence to be displayed on a screen of the terminal user, called the visibility zone, being determined according to navigation commands, characterized in that the video patches are provided to the user terminal, for one part, via a first transmission network and, for another part, via a second transmission network distinct from said first transmission network.

Thus the use of a double network enables the transmission of video patches to be distributed over two networks. The risks of congestion of such a network are thus lower.

According to a preferred embodiment, the first transmission network is a general broadcast network, also called a broadcast network, and the second transmission network is a personalised broadcast network.

According to a particular mode, the second transmission network is a broadband network comprising a return channel and the video patches are transmitted to the user terminal via this network after transmission of a request on the return channel.

The use of these two transmission networks has the following advantages:
- the bandwidth of the personalised broadcast network is less "costly" than the bandwidth of the broadcast network, the bandwidth of the global network can thus be increased at less cost with respect to a general broadcast network,
- the personalised broadcast network does not enable a bitrate sufficient for all the users, particularly for those that are far from a DSLAM (Digital Subscriber Line Access Multiplexer) to be guaranteed, the broadcast network enables this bitrate to be increased.

With the invention, the creation of interactive navigation services can thus be considered in which the service subscribers have an access to the set of video patches transmitted via the two networks while the non-subscribers only have access to the video patches provided by one of the networks.

For example, in the case of a police investigation programme, the subscribers can navigate in the totality of the crime scene to recover clues while the non-subscribers only have access to a more limited zone of the scene that corresponds to the video patches transmitted by the general broadcast network.

Another possible application relates to the panoramic retransmission of sporting events taking place in a stadium. For example, in the context of the retransmission of an athletics meeting with several sporting disciplines taking place simultaneously (for example shot putt, high jump, pole vault, long jump, etc.), the subscribers would have the possibility of moving about throughout the stadium to view any of the disciplines while non-subscribers would only be able to view a single discipline, namely that which is diffused in the broadcast.

A service in which the non-subscribers are able to navigate through the entire panoramic scene but only the subscribers can zoom onto certain parts of the panoramic scene can also be considered. For this application, video patches corresponding to sub-sampled portions of the scene are transmitted in general broadcast and video patches providing additional definition are transmitted with the personalised broadcast network.

The use of such a double network to transmit video patches can however create display problems at user terminal level. In fact, the pre-fetching time and thus the display on-screen of a video patch varies according to the network responsible for its transmission. In the case of a general broadcast network, all of the video patches being broadcast without previous request, the presentation time on the screen of video patches can be relatively short. In the case of a personalised broadcast network with return channel, the video patches only being transmitted on demand by the user, the presentation time on the screen comprises the transmission time of the request to the server, the processing time of the request by the server, the transmission time of a video patch to the user terminal and the time for decoding and memorisation of the video patch in the user terminal. It is to be noted that the transmission time on the personalised broadcast network can vary in time according to the state of the network. This presentation time disparity between the transmission networks must then be taken into account in the video patches pre-fetching process.

One solution could consist in synchronizing the processing of video patches by placing in buffer memory the video patches from the faster network in order to then align them with those from the slower network. This solution would not however be satisfactory as it comprises antagonistic actions, namely, initially, video patches are pre-fetched, then subsequently, the display is delayed.

According to a variant of the invention, another solution is thus proposed, namely to pre-fetch sufficiently early the video patches coming from the slower transmission network so as to not have to delay the display of video patches coming from the faster network. This result is obtained by defining, for each video patch, a detection zone as defined previously but for which the size is according to the transmission network providing said video patch. The size of the detection zone of video patches transmitted by the slower network is taken at greater than that of video patches transmitted by the faster network so that the pre-fetching of video patches coming from the slower network begins before that of video patches from the other network.

For this purpose, the method of the invention also comprises the following steps for:
- defining, for each video patch, at least one zone, called the detection zone, surrounding said video patch and having a size greater than the size of said video patch, the size of the detection zone of said video patch being according to the transmission network providing said video patch,
- as soon as the visibility zone enters into the detection zone of a video patch, the pre-fetching of said video patch is required in a memory of said user terminal, and
- as soon as the visibility zone enters into a pre-fetched video patch, said video patch is displayed on the screen of the user terminal.

In the present description, pre-fetching of a video patch is understood to mean the operations consisting in receiving said video patch in the user terminal, possibly decoding it, and memorizing it in a memory of the terminal. In the case of a transmission network comprising a return channel (terminal to server), this pre-fetching also comprises a prior step of transmission of a request to trigger the transmission of said video patch via the server as well as the transmission of said video patch.

The time for pre-fetching of a video patch provided by a broadcast network comprises notably the demultiplexing of the service transporting the video patches, the reception waiting time for a frame I (frame with Intra-frame coding) and the video patch decoding time.

The pre-fetching time of a video patch provided by a personalised broadcast network with return channel comprises notably the transmission time of the request from the user terminal to the second server, the processing time for the request by the second server, the transmission time for the video patch between the second server and the user terminal, the decoding time of image portions of the video patch and the memorisation time for the video patch in the user terminal.

According to an advantageous embodiment, the video patch transmitted by the personalised broadcast network starts with a frame I to eliminate the waiting time of such a frame.

In this embodiment, though the pre-fetching time for video patches provided by the personalised broadcast network does not comprise the frame waiting time I, it remains however generally greater than that of video patches provided by the general broadcast network.

To compensate at least partially for this different in pre-fetching time between the two transmission networks, the size of the detection zone for video patches provided by the personalised broadcast network is taken greater than the size of the detection zone for video patches provided by the general broadcast network.

According to a particular embodiment, the frontier of an image portion and the frontier of the detection zone are separated by a distance d predetermined over the entire perimeter of the image portion.

According to a particular embodiment, each video patch is encoded into layers and comprises for this purpose a layer of base video data, called the base layer, and at least one layer of additional video data, called the enhancement layer. In this embodiment, a detection zone is defined for each of the base and enhancement layers of the video patch, the pre-fetching of the base layer or of the enhancement layer being required when the visibility zone enters into the corresponding detection zone.

According to a particular embodiment, the size of the detection zone of said enhancement layer is different in size to the detection zone of the base layer. The detection zone of the enhancement layer encompasses for example the detection zone of the base layer so that the pre-fetching of the enhancement layer starts before the pre-fetching of the base layer.

According to a particular embodiment, a threshold displacement speed of the visibility zone, called the first threshold speed is associated with the base layer that is for example the maximum authorized displacement speed of said visibility zone. In this embodiment, the size of the detection zone of the base layer is determined according to said first threshold speed.

According to a particular embodiment, a displacement threshold speed of the visibility zone is associated with each enhancement layer, called the second threshold speed, beyond which said enhancement layer is not pre-fetched in the user terminal even if the visibility zone enters into the detection zone of said at least one enhancement layer.

According to a particular embodiment, the size of the detection zone of each enhancement layer is determined notably according to said second threshold speed.

According to an advantageous embodiment, for each enhancement layer not pre-fetched, between the entry of the visibility zone into the detection zone of said enhancement layer and the exit of the visibility zone from said detection zone, there are periodic comparisons made of the immediate displacement speed of the visibility zone at the second threshold speed associated with said enhancement zone and, if the immediate displacement speed of the visibility zone is less than at said second threshold speed, the pre-fetching of said enhancement layer is required.

Finally, according to another advantageous embodiment, for each enhancement layer not pre-fetched, between the entry of the visibility zone into the detection zone of said enhancement layer and the exit of the visibility zone from said detection zone, there are periodic comparisons made of the immediate displacement speed of the visibility zone at the second threshold speed associated with said enhancement zone and, if the immediate displacement speed of the visibility zone is greater than at said second threshold speed, the cessation of the pre-fetching of said enhancement layer is required.

BRIEF DESCRIPTION OF THE DRAWINGS

The invention will be better understood, and other aims, details, characteristics and advantages will appear more clearly over the course of the detailed description which follows in referring to the figures in the appendix, showing in.

DETAILED DESCRIPTION OF PREFERRED EMBODIMENTS

According to the invention, the panoramic video sequence to be displayed on the screen of a user terminal, for example a television connected to a set top box, is divided into a plurality of video patches, these patches being provided by at least two distinct transmission networks.

These two networks are preferably a general broadcast network and a personalised broadcast network with or without a return channel. The general broadcast network, called a broadcast network hereafter in the description, broadcasts video to a very high number of users via radio, satellite or cable channel. The personalised broadcast network broadcasts video data to a more limited number of users, who are for example subscribers to a service using this network. This network is referred to hereafter in the description as the "broadband network". This network is for example a broadband broadcast network with or without a return channel.

Hereafter in the description, it will be considered that the video patches are provided for one part via a broadcast network and for another part via a broadband network with a return channel.

Figure 1:
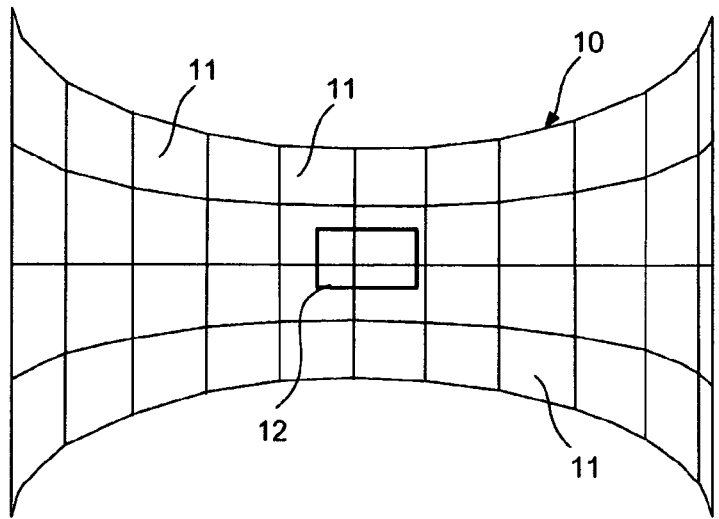
FIG. 1, already described, a panoramic video sequence divided into video patches, FIG. 2, already described, a partial view of FIG. 1 showing the part of the video sequence that is visible on the screen of the user terminal and the video patches contained, in total or in part, in this visibility zone, FIG. 3, already described, a view showing a detection zone of a video patch, FIG. 4, already described, a partial view of FIG. 1 showing the detection zones of video patches contained, in total or in part, in the visibility zone, FIG. 5 a view identifying the video patches transmitted via a general broadcast network and the video patches transmitted via a personalised broadcast network, FIG. 6, a system comprising a server connected to a user terminal via two distinct transmission networks, FIG. 7, a view showing detection zones of variable size according to the origin network of the video patches, FIG. 8, a view showing a particular embodiment in which each video patch is coded into a base layer and an enhancement layer, a detection zone being defined for each of the layers, FIG. 9, a flowchart showing the operations carried out when the visibility zone enters or leaves the detection zone of a video patch layer, FIG. 10, a flowchart showing the operations carried out for each of the layers for which the visibility zone is in their detection zone, FIG. 11, a view showing the size calculation of the detection zone with respect to that of a video patch, and FIG. 12, a view showing the pre-fetching time of a video patch from a personalised broadcast network with a return channel.
Figure 2:
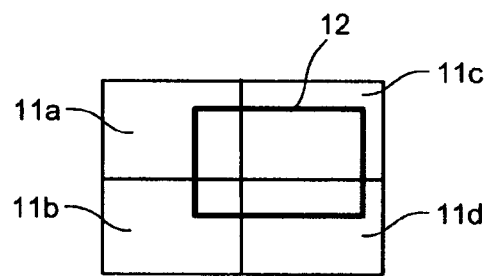
Figure 3:
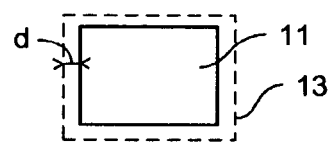
Figure 4:
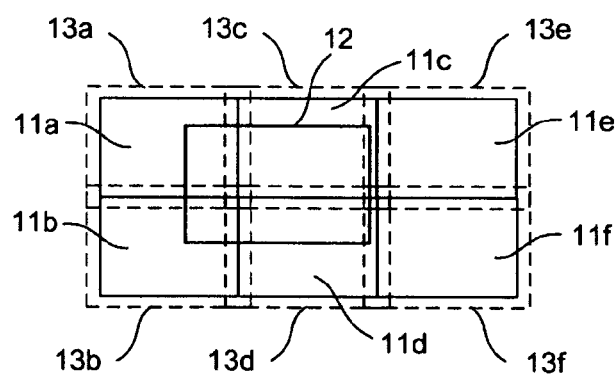
Figure 5:
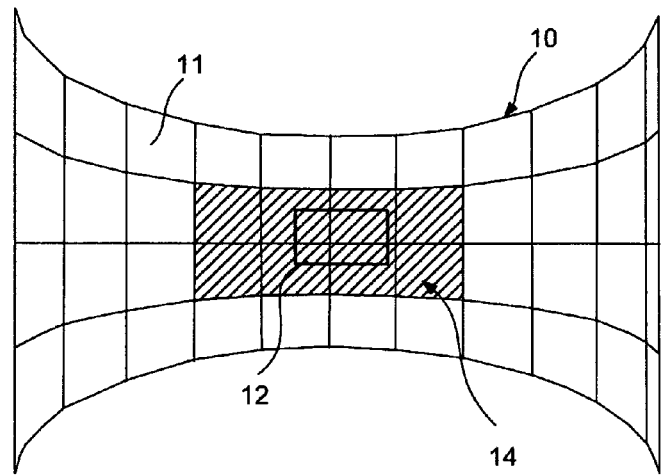

If FIG. 5 is referred to, showing the panoramic video sequence of FIG. 1, it can be considered for example that the video patches 14 of the shaded zone are transmitted via the broadcast network and that the other video patches (outside of the shaded zone) are transmitted on-demand via the broadband network.

Figure 6:
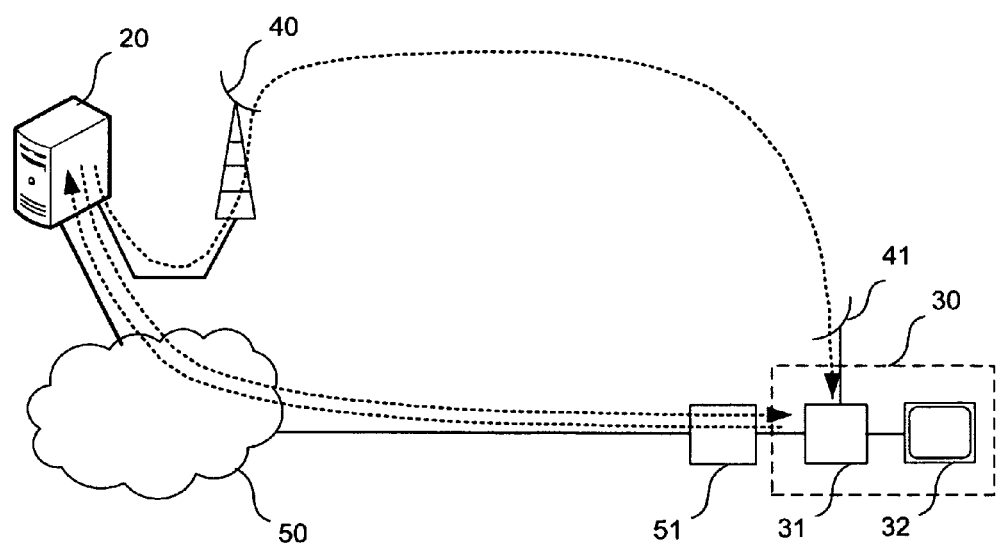

A system able to implement the method of the invention is shown diagrammatically in FIG. 6. The system comprises a server 20 in which is memorised the panoramic video sequence. The video sequence is divided into spatially non-overlapping video portions called video patches. Each video patch corresponds to a zone of the video sequence of rectangular form and predefined size, for example n×m pixels. The spatial position of a video patch in the video sequence is for example represented by the coordinates (x,y) of the left upper pixel of the video patch. These video patches are coded separately in the server.

A part of the video patches, for example the video patches 14 of FIG. 5, are provided by the server 20 to a user terminal 30 via a "broadcast" network shown in FIG. 6 via a transmitter antenna 40 connected to the server 20 and a receiver antenna 41 connected to the user terminal 30. The to other part of the video patches of panoramic images 10 is transmitted on demand by the server 20 to the user terminal 30 via a "broadband" network shown in FIG. 6 via an Internet network 50 and a connection gateway 51 connected on one hand to the Internet network 50 and on the other hand to the user terminal 30.

The terminal 30 comprises a set top box 31 able to receive and process video patches from two transmission networks and to transmit requests for transmission of video patches to the server 20 via the "broadband" network.

In the case of the broadcast network, the video sequence being a continuous video stream, the video patches are also continuous streams.

In the case of the "broadband" network, the video patches are provided on-demand at the server. They have either a predefined fixed duration, or a variable duration. In the first case (fixed duration), a predefined number of number of temporally successive video frame portions are for example transmitted to the terminal following the reception of a video patch demand request. In the second case (variable duration), the number of temporally successive video frame portions is indicated in the video patch demand request transmitted to the server or is defined by a video patch transmission demand request and an end of transmissions demand request to the server.

The video patches are advantageously coded in the server 20 according to a SVC (Scalable Video Coding). For this purpose, each video patch comprises a base video data layer, called the base layer, and at least one layer of additional video data, called the enhancement layer.

Advantageously, the video patches are transmitted via the "broadcast" network via a MPEG2-TS transport stream comprising elementary streams able to transport SVC video data layers as described in the document "Information Technology—Generic Coding of Moving Pictures and Audio: Systems: Transport of scalable video over ITU-T Rec. H.222.0", ISO/IEC 13818-1, Amendment 3, 2005.

Moreover, the video patches are advantageously transported via the "broadband" network via HTTP streams as described in the document "HTTP Live Streaming, draft-pantos-http-live-streaming-01" by R. Pantos, Apple Inc, June 2009. The video patches transported via the broadband network have thus a predefined fixed duration.

In the case where these two transport mechanisms deliver TS (Transport Stream) packets using the same PCR (Program Clock Reference) for all of the video patches, then the synchronisation of these two is in accordance with the technology generally used in digital television.

As a variant, the transport protocol employed for the "broadband" network is a RTP/UDP/IP protocol that can be associated with a RTSP switching protocol.

At least one detection zone surrounding the zone of the video patch is defined for each video patch.

According to an important characteristic of the invention, the size of the detection zone for video patches provided by the "broadband" network is greater than the size of the detection zone for video patches provided by the "broadcast" network. This characteristic is illustrated by FIG. 7.

Figure 7:
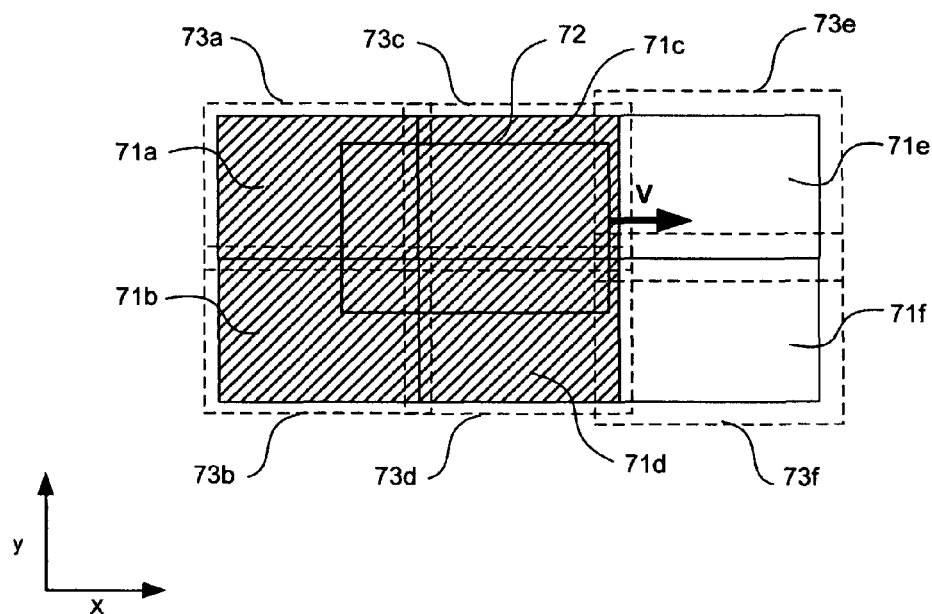

FIG. 7 shows six video patches, referenced 71a to 71f, adjacent and disposed according to 2 rows of 3 video patches. The video patches 71a to 71d are provided to the user terminal via the "broadcast" network and the video patches 71e and 71f are provided on request via the "broadband" network. The detection zones of these video patches 71a to 71f are referenced respectively 73a to 73f in FIG. 7. As can be seen from this figure, the size of the detection zones 73e and 73f of video patches provided via the broadband network is greater than that of the detection zones 73a to 73d of video patches provided via the broadcast network to compensate for the transmission time and processing of the request by the server 20 and the duration of the transmission of video patches provided via the broadband network.

A command for pre-fetching a video patch is triggered in the set top box 31 when the visibility zone, referenced 72 in FIG. 7, enters into the to detection zone of said video patch.

In the example of FIG. 7, given that the zone 72 covers at least partially the detection zones 73a to 73f, a command for pre-fetching of video patches 71a to 71f was triggered. The pre-fetching commands of different patches are not transmitted simultaneously but according to the displacement of the visibility zone. If the displacement represented by the arrow in FIG. 7 is referred to, the patches 71a and 71b are first requested, then the patches 71c and 71d and finally the patches 71e and 71f.

In relation to the frames of video patches 71a to 71d, these are pre-fetched in a memory of the set top box 31 as they are delivered by the broadcast network for a duration extending up to their presentation time or up to the exit from the detection zone.

Figure 8:
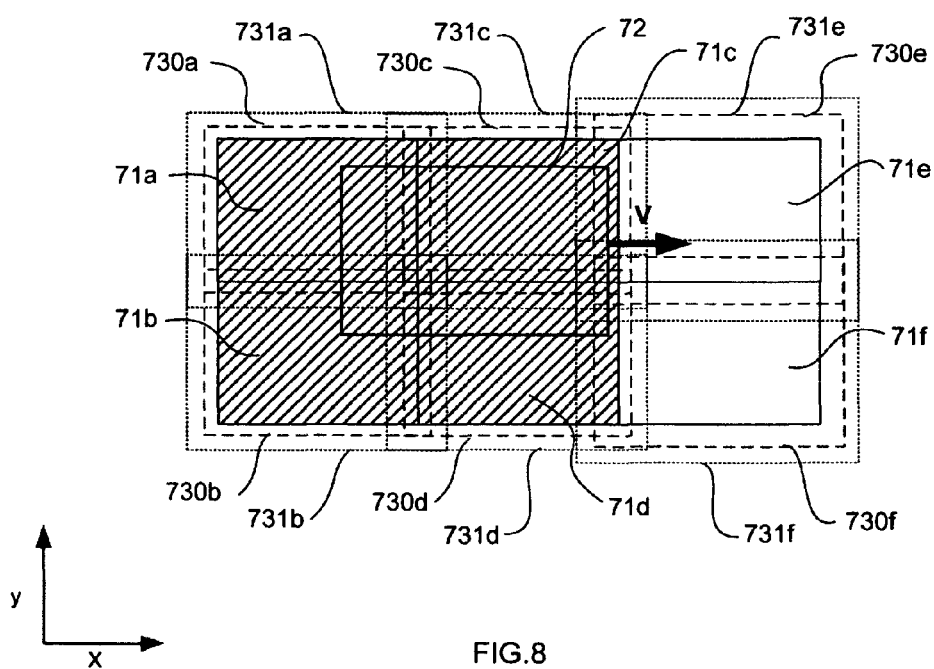

In relation to the video patches 71e and 71f, a request is transmitted to the server 20 for each of these video patches via the broadband network so that the server transmits the corresponding frames to the user terminal 30 via the broadband network. According to an advantageous embodiment, the video patches transmitted by the server 20 being coded according to SVC mode, for each video patch layer to be transmitted a detection zone is defined, namely a base detection zone for the base layer and an additional detection zone for each enhancement layer. This embodiment is shown in FIG. 8.

In this figure, each video patch 71a to 71f comprises a base layer and an enhancement layer. Each video patch 71a to 71f has a detection zone, respectively 730a to 730f, for its base layer and a detection zone, respectively 731a to 731f, for its enhancement layer. In this embodiment the detection zone of the enhancement layer encompasses the base layer detection zone. Thus in this embodiment, the pre-fetching of the enhancement layer can, in the absence of other criteria, start before the pre-fetching of the base layer.

However, according to an advantageous embodiment, the decision to pre-fetch an enhancement layer is taken according to the displacement speed V of the visibility zone. For reasons of simplification, it is considered in FIGS. 7 and 8 that the visibility zone 12 displaces only in the direction X. But naturally, the method of the invention can be applied to the case where the visibility zone 12 displaces in all directions.

Figure 9:
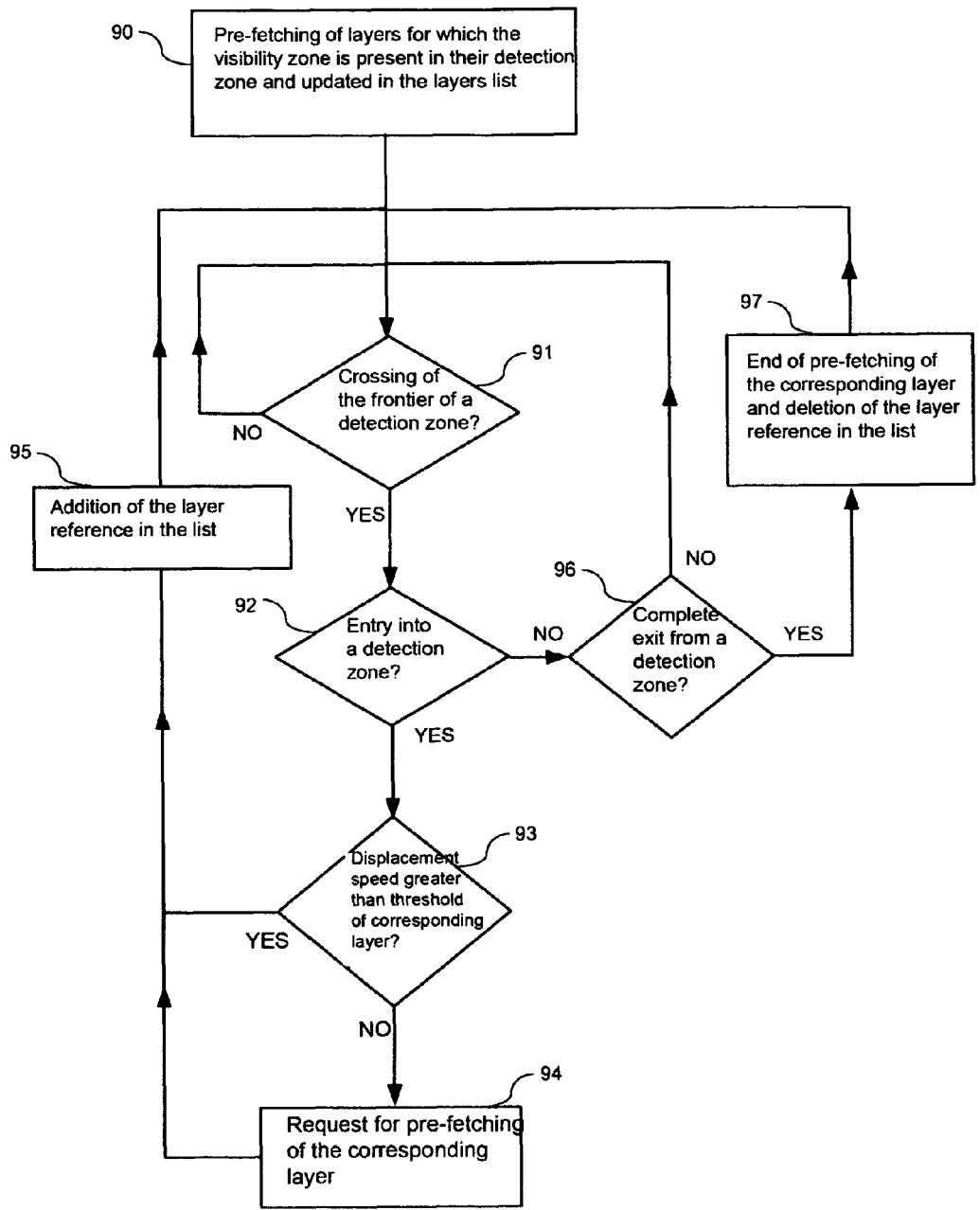

In this embodiment, the user terminal 30 regularly determines the position of the visibility zone 12, its displacement direction and its displacement speed. The decision to download a base or enhancement layer is taken in accordance with the flow chart of FIG. 9.

According to this flow chart, the first step (step 90) consists in initializing the process by requesting the pre-fetching of base and enhancement layers for which the visibility zone is present in their detection zone. The references of each of these layers are stored in a list called Llayers. The data presentation timestamp of the layer to be pre-fetched was estimated in a way so that the layer was received at the instant where it had to be presented. Then, it is verified if the frontier of a detection zone of a video patch layer is crossed (step 91). If yes, it is verified if it involves the entry into the detection zone of the video patch layer (step 92) If this is not the case, it is verified if the visibility zone entirely exits the detection zone (step 96). If this is the case, the pre-fetching of this layer is stopped (step 97), the reference of this layer is deleted from the list Llayers and step 91 is started again. If the visibility zone does not entirely exit the detection zone, there is a return to step 91. If it involves the entry into a detection zone of a layer, the displacement speed of the visibility zone is compared with a predefined threshold speed associated with said layer (step 93). If the displacement speed of the visibility zone is greater than or equal to the threshold speed, said layer is not pre-fetched and the reference of the layer is added in the list Llayers (step 95) and step 91 is started again. If the displacement speed of the visibility zone is less than the threshold speed, the pre-fetching of the layer relating to said detection zone is triggered (step 94) then it begins again at step 91.

According to this method, the pre-fetching of an enhancement layer is only triggered if the displacement speed of the visibility zone is less than the threshold speed associated with this enhancement layer, which is for example several hundreds of pixels per second. In fact, if the visibility zone displaces very rapidly, it is not necessary to trigger the pre-fetching of the enhancement layer in that this layer will not improve the user experience. However, the pre-fetching of the base layer is designed to be triggered systematically whatever the displacement speed of the visibility zone by fixing a threshold speed for the base layer greater than or equal to the maximum displacement speed of the visibility zone.

If the video patch comprises several enhancement layers, for example a medium layer (medium level) and a high layer (high level), a threshold speed is advantageously defined for each of these two enhancement layers, the threshold speed of the medium layer being preferably greater than the threshold speed of the high layer.

After the entry of the visibility zone into the detection zone of the base layer, there is a certainty that the pre-fetching of the video patch base layer has been triggered because the pre-fetching of this layer takes place whatever the displacement speed of the visibility zone (the threshold speed of the base layer being greater than the maximum displacement speed of the visibility zone). However, the pre-fetching of the enhancement layer(s) may not have been triggered if the displacement speed of the visibility zone was greater than the associated threshold speed at the instant of the entry into the detection zones of these enhancement layers. But, during the displacement of the visibility zone in the detection zone of the base layer, the displacement speed may have changed. For example, the displacement speed of the visibility zone may have diminished between the entry of said visibility zone in the detection zone of an enhancement layer and its exit from this detection zone and have passed under the threshold speed associated with an enhancement layer. The absence of an enhancement layer in the displayed video data can then be visible on the screen (low resolution).

Figure 10:
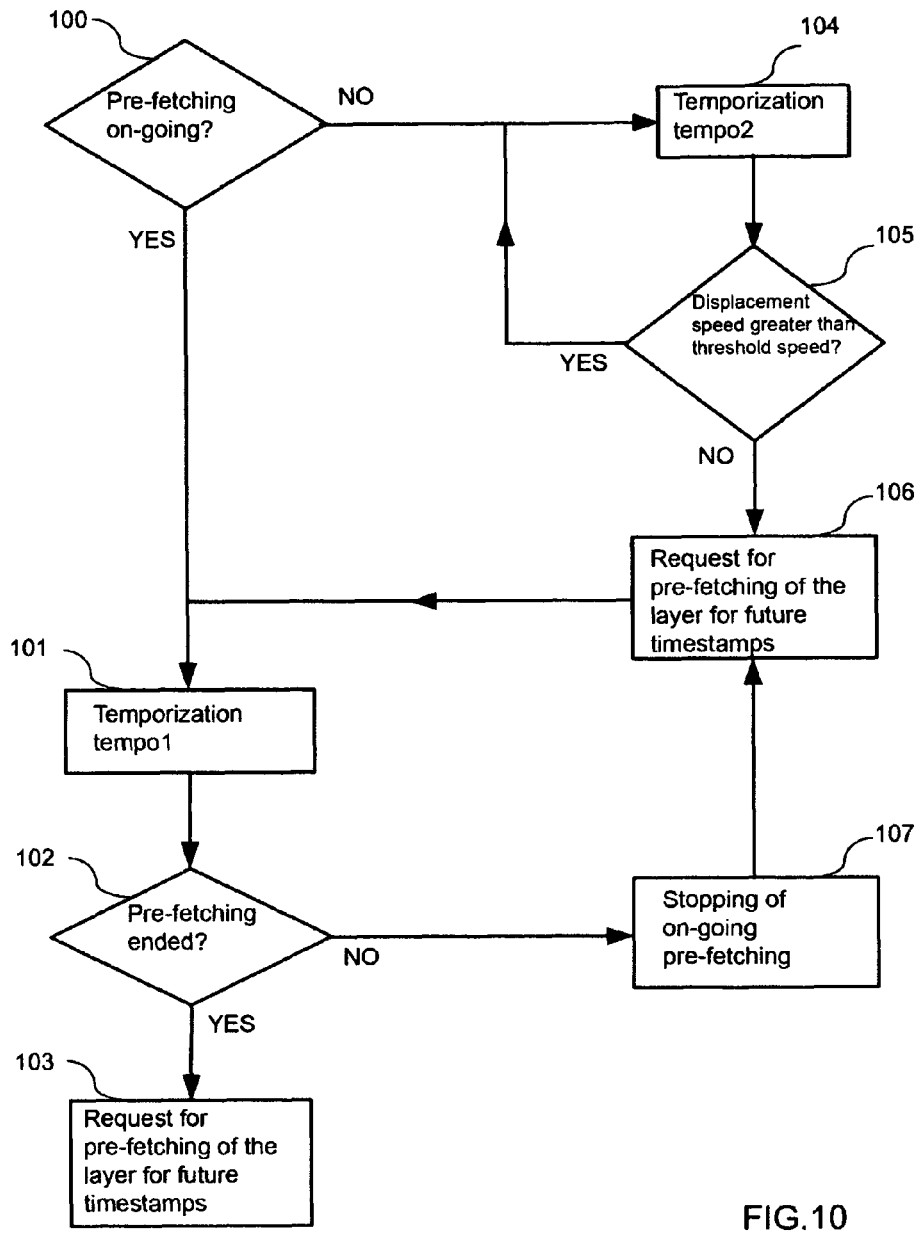

According to an advantageous embodiment, a periodic verification process is provided to adapt the number of enhancement layers to be pre-fetched according to the instantaneous displacement speed of the visibility zone. This process is shown in FIG. 10 and applies to each of the layers for which the visibility zone is presented in their detection zone, namely the layers referenced in the list Llayers defined previously.

According to a step 100, there is a verification to see if the pre-fetching of the layer is on-going. If this is the case, there is a temporizing step (step 101), that is to say the process of verification is paused to wait for the end of the pre-fetching of the layer for the requested timestamps, for a duration tempo1 then it is verified that the pre-fetching has ended (step 102). The duration tempo1 represents, for a layer for which the pre-fetching has been triggered, the waiting time before verifying if this layer is ready to be presented. The value of this temporization is the difference between the presentation timestamp of the layer and the current timestamp.

If the pre-fetching of the layer has not been triggered because the displacement speed of the visibility zone was greater than the threshold speed of the layer, there is a temporization step (step 104), for a duration tempo2 then there is a comparison of the displacement speed of the visibility zone with the threshold speed of the layer (step 105).

If the displacement speed of the visibility zone is greater than the threshold speed then there is a return to step 104. If not, a request for pre-fetching is made (step 106) then it goes to step 101. The duration tempo2 represents, for a layer for which the pre-fetching has not been triggered, the period between two comparison tests of the displacement speed of the visibility zone with the threshold speed of the layer. This period can be different from one layer to another. This period corresponds for example to the duration that the visibility zone uses to cross the detection zone of the layer at the threshold speed.

In step 102, if the pre-fetching is ended, there is a return to the nominal mode (step 103) that consists in pre-fetching the layer for future timestamps while the visibility zone is in the detection zone of this layer.

However if the pre-fetching is not ended, then the layer will arrive after the instant when it should have been presented, the on-going pre-fetching is thus stopped (step 107) and the method goes to step 106 that consists in again requesting the pre-fetching of the layer with a future presentation timestamp.

According to this process, if an enhancement layer has not been pre-fetched even though the displacement speed of the visibility zone has become less than the threshold speed associated with this enhancement layer and though the detection zone of this layer is still comprised in the visibility zone, said enhancement layer is then pre-fetched.

Even though this process is mainly dedicated for enhancement layers, it can equally be applied to base layers. In fact, even if the pre-fetching of a base layer is systematically triggered as soon as the visibility zone enters into the detection zone of the base layer, the patch may not have been received at the instant when it should have been presented due to problems linked to the network or the server. This algorithm enables the pre-fetching to be re-launched if such a problem occurs.

Advantageously, a process to stop the pre-fetching of an enhancement layer can be planned for if the displacement speed of the visibility zone increases suddenly and passes above the threshold speed associated with this enhancement layer. This process can be implemented via a test step between the steps 102 and 102.

Figure 11:
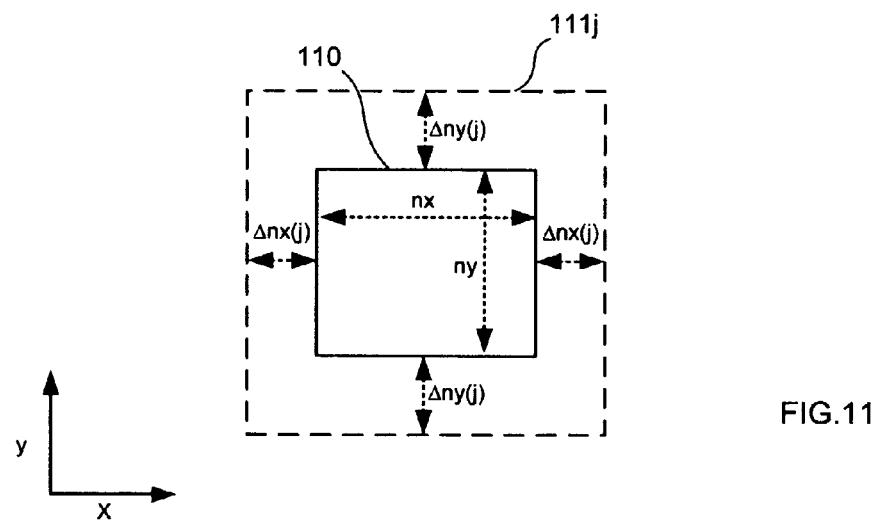

To ensure that the pre-fetching of a base or enhancement layer begins sufficiently early, the size of detection zones are preferably adapted to the displacement speed of the visibility zone. The size of detection zones is for example calculated in the following way. A video portion 110 is considered for example, that is rectangular with nx×ny pixels and a rectangular detection zone 111$j$ encompassing said video portion having [nx+2Δnx(j)]×[ny+2Δny(j)] pixels, the detection zone relating to the layer j of the video patch. This example is illustrated by FIG. 11.

The layer 0 relates for example to the base layer, the layer 1 to the medium enhancement layer and the layer 2 to the high enhancement layer.

According to a particular embodiment, Δnx(j) is calculated in the following manner:

$$\Delta nx(j) \geq \text{seuil\_vitesse\_}x(j) * \text{temps\_préch arg ement}(j)$$

where
threshold_speed_x(j) represents the threshold speed according to the direction x of the layer j expressed in pixels per second; and
pre-fetching_time(j) represents the duration to acquire and decode at least one frame I (frame with Intra-frame coding) of the layer j of the video patch.

The threshold speed of enhancement layers corresponds to the threshold speed used previously for the pre-fetching decision of these layers. The threshold speed of the base coat corresponds to the maximum speed authorised for displacement of the visibility zone in the panoramic scene.

The video patch layers pre-fetching time varies according to the transmission network used for to transmit them.

In the broadcast network, all of the video patches are broadcast (without request) and provided to the terminal, the terminal pre-fetches them when the visibility zone enters into the detection zone(s). When the visibility zone enters into a detection zone, a frame I of the video patch may not necessarily already be received by the terminal and it is best then to wait. Thus, the pre-fetching time corresponds to the duration between the entry into the detection zone and the instant when the video patch can be resituated on the user screen. This pre-fetching time thus comprises the durations required for demultiplexing, the wait for the next frame I, the filling of the decoding buffer, the decoding and memorisation and re-ordering of video frames before presentation of the video patch.

Figure 12:
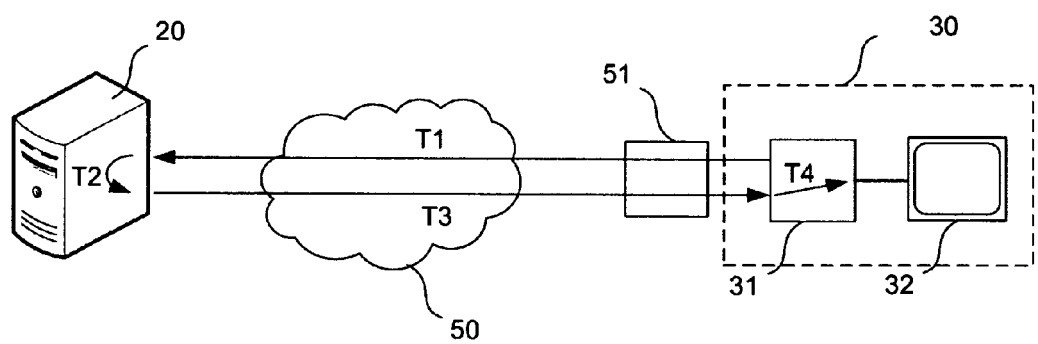

In the broadband network, the video patch is only provided by the network if it was previously requested from the server by the terminal. In this case, the pre-fetching time is defined as shown in FIG. 12:

$$\text{Pre-fetching\_}time = T1 + T2 + T3 + T4$$

where:
T1 is the duration of the transmission of the request to the server,
T2 is the duration of the processing of the request by the server,
T3 is the transmission time of the video patch to the terminal, and
T4 is the duration of the memorisation and decoding of the video patch in the terminal.

T2 depends on the server and T4 depends on the terminal. T1 and T3 depend on the RU (Round-Trip delay Time) of the network. T3 also depends on the network bandwidth, the size of the video patch and the signalling introduced by the transmission protocols (HTTP, RTP, etc.).

Thus, according to the invention, the size of the detection zone of a video patch is defined according to the network responsible for providing it. Moreover, the triggering and/or the continuation of the pre-fetching of a video patch is decided according to the displacement speed of the visibility zone.

Although the invention has been described in relation to different particular embodiments, it is obvious that it is in no way restricted and that it comprises all the technical equivalents of the means described together with their combinations if the latter fall within the scope of the invention.

The invention claimed is:

1. A method in a user terminal apparatus for navigation in a panoramic video sequence displayed on said user terminal apparatus, the panoramic video sequence being divided into a plurality of non-overlapping video portions, called video patches, each corresponding to a zone of the panoramic video sequence, each video patch having a size and a spatial position in said panoramic video sequence, the video patches required to form a zone of the panoramic video sequence to be displayed on a screen of the user terminal, called a visibility zone, being determined according to navigation commands, said method comprising:
receiving some first video patches, corresponding to a subpart of said panoramic video sequence, at said user terminal via a first transmission network, said first network being a broadcast network;
receiving, according to said navigation commands and according to the position of said visibility zone in said panoramic video sequence, some second video patches, corresponding to the rest of said panoramic video sequence, at said user terminal via a second transmission network distinct from said first transmission network, said second network comprising a return channel;
for each of said first and second video patches, at least one zone is defined, called a detection zone, surrounding said video patches and having a size greater than the size of said video patches, the size of the detection zone of said video patches being according to the transmission network providing said video patches;
as soon as the visibility zone enters into the detection zone of a video patch from said second video patches, pre-fetching of said second video patch is required in a memory of said user terminal; and
as soon as the visibility zone enters into a video patch available in said memory of said user terminal, said video patch is displayed on the screen of the user terminal.

2. The method according to claim 1, wherein the second transmission network is a broadband network, via which the video patches are transmitted to the user terminal after transmission of a request on the return channel.

3. The method according to claim 1, wherein the size of the detection zone of said second video patches provided via the second transmission network is greater than the size of the detection zone of said first video patches provided via the first transmission network.

4. The method according to claim 1, wherein each video patch is coded into a base video data layer, called a base layer, and at least one additional video data layer, called an enhancement layer and in that a detection zone is defined for each of the base and enhancement layers of the video portion, the pre-fetching of the base layer or of the enhancement layer being required when the visibility zone enters into the corresponding detection zone.

5. The method according to claim 4, wherein the size of the detection zone of said at least one enhancement layer is greater than the size of the detection zone of the base layer.

6. The method according to claim 5, wherein a displacement threshold speed of the visibility zone is associated with said base layer, called a first threshold speed, and in that the size of the detection zone of the base layer is determined according to said first threshold speed.

7. The method according to claim 6, wherein a displacement threshold speed of the visibility zone is associated with said enhancement layer, called a second threshold speed, beyond which said enhancement layer is not pre-fetched in the user terminal even if the visibility zone enters into the detection zone of said at least one enhancement layer.

8. The method according to claim 7, wherein the size of the detection zone of said at least one enhancement layer is determined according to said second threshold speed.

9. The method according to claim 8, wherein for each enhancement layer not pre-fetched, between an entry of the visibility zone into the detection zone of said enhancement layer and an exit of the visibility zone from said detection zone, there are periodic comparisons made of an immediate displacement speed of the visibility zone at the second threshold speed associated with said enhancement zone and, if the immediate displacement speed of the visibility zone is less than at said second threshold speed, the pre-fetching of said enhancement layer is required.

10. The method according to claim 9, wherein for each enhancement layer not pre-fetched, between an entry of the visibility zone into the detection zone of said enhancement layer and an exit of the visibility zone from said detection zone, there are periodic comparisons made of an immediate displacement speed of the visibility zone at the second threshold speed associated with said enhancement zone and, if the immediate displacement speed of the visibility zone is greater than at said second threshold speed, the termination of the pre-fetching of said enhancement layer is required.

11. A user terminal apparatus, for navigating in a panoramic video sequence, the panoramic video sequence being divided into a plurality of non-overlapping video portions, called video patches, each corresponding to a zone of the panoramic video sequence, each video patch having a size and a spatial position in said panoramic video sequence, the video patches required to form a zone of the panoramic video sequence to be displayed on a screen of said user terminal apparatus, called a visibility zone, being determined according to navigation commands, said user terminal apparatus comprising a decoder configured to:
receive some first video patches, corresponding to a sub-part of said panoramic video sequence, via a first transmission network, said first network being a broadcast network;
receive, according to said navigation commands and according to the position of said visibility zone in said panoramic video sequence, some second video patches, corresponding to the rest of said panoramic video sequence, via a second transmission network distinct from said first transmission network, said second network comprising a return channel;
define, for each of said first and second video patches, at least one zone, called a detection zone, surrounding said video patches and having a size greater than the size of said video patches, the size of the detection zone of said video patches being according to the transmission network providing said video patches,
as soon as the visibility zone enters into the detection zone of a video patch from said second video patches, pre-fetch said second video patch in a memory of said user terminal apparatus; and
as soon as the visibility zone enters into a video patch available in said memory of said user terminal apparatus, display said video patch on the screen of the user terminal apparatus.

12. A method in a user terminal apparatus for navigation in a panoramic video sequence displayed on said user terminal apparatus, the panoramic video sequence being divided into a plurality of non-overlapping video portions, called video patches, each corresponding to a zone of the panoramic video sequence, each video patch having a size and a spatial position in said panoramic video sequence, the video patches required to form a zone of the panoramic video sequence to be displayed on a screen of the user terminal, called a visibility zone, being determined according to navigation commands, wherein:
some first video patches are received at said user terminal via a first transmission network and some second video patches are received at said user terminal via a second transmission network distinct from said first transmission network according to said navigation commands and according to the position of said visibility zone in said panoramic video sequence, said method further comprising:
defining, for each of said first and second video patches, at least one zone, called a detection zone, surrounding said video patches and having a size greater than the size of said video patches, the size of the detection zone of said video patches being according to the transmission network providing said video patches;
as soon as the visibility zone enters into the detection zone of a video patch, pre-fetching of said video patch is required in a memory of said user terminal; and
as soon as the visibility zone enters into a pre-fetched video patch, displaying said video patch on the screen of the user terminal;
wherein each video patch is coded into a base video data layer, called a base layer, and at least one additional video data layer, called an enhancement layer and in that a detection zone is defined for each of the base and enhancement layers of the video portion, the pre-fetching of the base layer or of the enhancement layer being required when the visibility zone enters into the corresponding detection zone.

13. The method according to claim 12, wherein the size of the detection zone of said at least one enhancement layer is greater than the size of the detection zone of the base layer.

14. The method according to claim 13, wherein a displacement threshold speed of the visibility zone is associated with said base layer, called the first threshold speed, and in that the size of the detection zone of the base layer is determined according to said first threshold speed.

15. The method according to claim 14, wherein a displacement threshold speed of the visibility zone is associated with said enhancement layer, called a second threshold speed, beyond which said enhancement layer is not pre-fetched in the user terminal even if the visibility zone enters into the detection zone of said at least one enhancement layer.

16. The method according to claim 15, wherein the size of the detection zone of said at least one enhancement layer is determined according to said second threshold speed.

17. The method according to claim 16, wherein for each enhancement layer not pre-fetched, between an entry of the visibility zone into the detection zone of said enhancement layer and an exit of the visibility zone from said detection zone, there are periodic comparisons made of an immediate displacement speed of the visibility zone at the second threshold speed associated with said enhancement zone and, if the immediate displacement speed of the visibility zone is less than at said second threshold speed, the pre-fetching of said enhancement layer is required.

18. The method according to claim 17, wherein for each enhancement layer not pre-fetched, between an entry of the visibility zone into the detection zone of said enhancement layer and an exit of the visibility zone from said detection zone, there are periodic comparisons made of an immediate displacement speed of the visibility zone at the second threshold speed associated with said enhancement zone and, if the immediate displacement speed of the visibility zone is greater than at said second threshold speed, the termination of the pre-fetching of said enhancement layer is required.

* * * * *